United States Patent
Wei et al.

(10) Patent No.: US 11,768,476 B2
(45) Date of Patent: Sep. 26, 2023

(54) LASER CUTTING METHOD AND SYSTEM FOR IRREGULAR PARTS BASED ON MACHINE VISION

(71) Applicant: Guangdong University of Technology, Guangzhou (CN)

(72) Inventors: Lijun Wei, Guangzhou (CN); Tai Zhang, Guangzhou (CN); Qiang Liu, Guangzhou (CN); Libin Lin, Guangzhou (CN); Ailin Yu, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/066,362

(22) Filed: Dec. 15, 2022

(65) Prior Publication Data

US 2023/0136158 A1      May 4, 2023

(30) Foreign Application Priority Data

Dec. 15, 2021   (CN) .......................... 202111537568.3

(51) Int. Cl.
*B23K 26/38*      (2014.01)
*B23K 26/03*      (2006.01)
*G05B 19/19*      (2006.01)

(52) U.S. Cl.
CPC ............ *G05B 19/19* (2013.01); *B23K 26/032* (2013.01); *B23K 26/38* (2013.01);
(Continued)

(58) Field of Classification Search
CPC .......... G05B 19/19; G05B 2219/34112; G05B 2219/36199; G05B 2219/49372; B23K 26/032; B23K 26/38; G06Q 10/047
See application file for complete search history.

(56) References Cited

U.S. PATENT DOCUMENTS

| | | | | |
|---|---|---|---|---|
| 3,596,068 A | * | 7/1971 | Doyle | A41H 3/007 702/158 |
| 2006/0032348 A1 | * | 2/2006 | Veikkolainen | B26D 5/00 83/13 |

(Continued)

FOREIGN PATENT DOCUMENTS

| | | |
|---|---|---|
| CN | 104150759 A | 11/2014 |
| CN | 111299815 A | 6/2020 |

(Continued)

OTHER PUBLICATIONS

Sherif et al, "Sequential optimization approach for nesting and cutting sequence in laser cutting", pp. 624-638, downloaded from https://www.sciencedirect.com/science/article/pii/S0278612514000661?via%3Dihub (Year: 2014).*

(Continued)

*Primary Examiner* — Christopher E. Everett
*Assistant Examiner* — Olvin Lopez Alvarez (57) ABSTRACT

A laser cutting method for irregular parts based on machine vision includes: (A) obtaining and numbering vertices of all parts on the layout diagram; (B) planning a part vertex set and an empty cutting path vertex set; (C) obtaining a shortest empty cutting path and the empty cutting path vertex set with the shortest empty cutting path; (D) cutting the parts one by one according to an order obtained by the CPLEX algorithm. This application further provides a laser cutting system.

2 Claims, 5 Drawing Sheets (52) U.S. Cl.
CPC ............. *G05B 2219/34112* (2013.01); *G05B 2219/36199* (2013.01); *G05B 2219/49372* (2013.01)

(56) References Cited

U.S. PATENT DOCUMENTS

| | | | |
|---|---|---|---|
| 2014/0005804 A1 | 1/2014 | Brand | |
| 2018/0173201 A1* | 6/2018 | Norberg Ohlsson | B23K 10/00 |
| 2020/0068909 A1* | 3/2020 | Blaine | G05B 19/4166 |

FOREIGN PATENT DOCUMENTS

| | | | | |
|---|---|---|---|---|
| CN | 113297638 | * | 8/2021 | ............ G06F 30/10 |
| CN | 13721544 | A | 11/2021 | |

OTHER PUBLICATIONS

Hajad et al, "Laser cutting path optimization with minimum heat accumulation", pp. 2569-2579, Nov. 5, 2019, downloaded from https://link.springer.com/article/10.1007/s00170-019-04455-x (Year: 2019).*

Syam et al ("Image processing algorithm to determine an optimised 2D laser cutting trajectory", pp. 6, 2019, downloaded from https://ieeexplore.ieee.org/document/8895106 (Year: 2019).*

Diego, "Traveling SalesmanProblem (TSP) with Miller-Tucker-Zemlin (MTZ) in CPLEX/OP", pp. 11, 2020, downloaded from https://co-enzyme.fr/blog/traveling-salesman-problem-tsp-in-cplex-opl-with-miller-tucker-zemlin-mtz-formulation/ (Year: 2020).*

Dewil et al, "A review of cutting path algorithms for laser cutters", 2016, pp. 1-33, file:///C:/Users/olopez/Downloads/s00170-016-8609-1.pdf (Year: 2016).*

Guangxun Chen, "Research on Path Optimization Algorithm for Laser Cutting", China Excellent Master's Degree Dissertation Full Text Database (Master) Information Technology Series, p. 11-16 of the text, 2009, pp. total 51.

Weiyi Wang et al., "Application of Machine Vision and Laser Cutting in Special-shaped Blister Packaging", Packaging Engineering, vol. 34, No. 23, pp. 116-120, 2013.

Chuanbo Dong, "A relaxation algorithm for solving the traveling salesman problem", Shandong Science, vol. 32, No. 4, Aug. 2019, p. 74-78 of the text.

Shihong Li et al., "Optimization on laser cutting process path based on ant colony algorithm", Forging & Stamping Technology, vol. 44, No. 4, Apr. 2019, pp. 69-72,77.

* cited by examiner

LASER CUTTING METHOD AND SYSTEM FOR IRREGULAR PARTS BASED ON MACHINE VISION

CROSS-REFERENCE TO RELATED APPLICATIONS

This application claims the benefit of priority from Chinese Patent Application No. 202111537568.3, filed on Dec. 15, 2021. The content of the aforementioned application, including any intervening amendments thereto, is incorporated herein by reference in its entirety.

TECHNICAL FIELD

This application relates to part packing and cutting, and more particularly to a laser cutting method and system for irregular parts based on machine vision.

BACKGROUND

Machine vision-based laser cutting methods for special-shaped parts have been widely used in industrial processing and production, such as wood processing, glass processing, steel cutting, and leather cutting. Most of articles needed in daily life and production are assembled from small parts, which are usually cut from the raw material plate. In the industrial production, two-dimensional irregular parts required by the order are reasonably laid out on a raw material plate, processed, and separated by using a laser cutting device. The cutting scheme has a great impact on the production efficiency. Laser cutting device is expensive, and subjects to wear and tear in the cutting process. Cutting time is also particularly critical for urgent orders. Reducing the empty travel of the laser cutting device can mitigate the loss and shorten the cutting time, thereby saving cutting costs and improving production efficiency.

At present, a route generation algorithm has been introduced to optimize the processing and cutting process of irregular parts. Some cutting strategies, in which all parts are separated at one time by using a complete cutting route, are not applicable to the cutting of smaller parts, and may cause inaccuracy and error when cutting small parts, such that rework and repair are required subsequently, affecting the production efficiency. Generally, the parts are cut one by one along a route from the bottom left to the top right until the last part is cut, and then the laser cutting device is moved to the starting position. In this case, one side may be repeatedly cut, and the cutting tool will suffer excessive wear. Moreover, the cutting time will be extended, affecting the production cycle and efficiency.

SUMMARY

In view of the deficiencies in the prior art, this application provides a laser cutting method and system for irregular parts based on machine vision, which can quickly find out the shortest empty cutting path of each part to be cut, and plan an optimized cutting path, improving the cutting efficiency, and mitigating the wear and tear of the cutting device.

Technical solutions of this application are described as follows.

In a first aspect, this application provides a laser cutting method for irregular parts based on machine vision, including:

(A) obtaining a layout diagram according to patterns of parts to be cut; and obtaining and numbering vertices of each of the parts to be cut on the layout diagram;

(B) planning vertex numbers of each of the parts to be cut into a part vertex set; and randomly extracting an element from the part vertex set followed by combining with a cutting starting point to form an empty cutting path vertex set;

(C) taking the empty cutting path vertex set as a travelling salesman problem (TSP); finding a shortest path passing through all vertices in the empty cutting path vertex set; solving an empty cutting path of the empty cutting path vertex set by using a CPLEX algorithm; and comparing empty cutting paths of empty cutting path vertex sets to obtain a shortest empty cutting path and an empty cutting path vertex set with the shortest empty cutting path;

(D) cutting the parts to be cut one by one according to an order obtained by the CPLEX algorithm; when cutting a part, selecting a vertex corresponding to a first element in an empty cutting path vertex set corresponding to the part as a starting point and selecting a vertex corresponding to a second element in the empty cutting path vertex set as an ending point to generate a cycle for cutting to obtain a physical cutting path; obtaining an empty cutting path from the starting point to a selected vertex in each part to be cut; and integrating the physical cutting path with the empty cutting path to obtain an optimized cutting path; and (E) when cutting the parts to be cut one by one, obtaining, by a visual inspection module, boundary information of a raw material sheet, and comparing the boundary information with the physical cutting path; when the physical cutting path coincides with a boundary of the raw material sheet, integrating the physical cutting path into the empty cutting path to obtain an optimal cutting path; and allowing a laser cutting module to emit laser rays for cutting in the physical cutting path and not to emit laser rays in the empty cutting path;

in the step (C), a mathematical model for comparing the empty cutting paths of the empty cutting path vertex sets to obtain the shortest empty cutting path and the empty cutting path vertex set with the shortest empty cutting path is expressed as follows:

$$\min \Sigma_{e \in A} C_e x_e \qquad (1)$$

s. t.

$$\Sigma_{e \in \Delta(i)} x_e = 2w_i, \forall i \in V, \qquad (2)$$

$$\Sigma_{e \in \Delta(p)} x_e = 2, \forall p \in P, \qquad (3)$$

$$\Sigma_{e \in \Delta(S)} x_e \leq |S| - 1, \forall S \subset P, 2 \leq |S| \leq n-1 \qquad (4)$$

$$x_e \in \{0,1\}, \forall e \in A, \qquad (5)$$

$$w_i \in \{0,1\}, \forall i \in V,; \qquad (6)$$

wherein A is a set of edges; V is a set of all vertices; p is a part vertex set; P is a set of parts corresponding to all part vertex sets; Ce represents a length of edge e; Xe is a basic variable; $W_i$ is an auxiliary variable; Δ(i) indicates a set of edges connected to point i; Δ(p) indicates a set of edges connected to points in the part vertex set p; and S represents a subset of the set P; and (E) when cutting the parts to be cut one by one, obtaining, by a visual inspection module, boundary information of a raw material sheet, and comparing the boundary information with the physical cutting path; when the physical cutting path coincides with a boundary of the raw material sheet, integrating the physical cutting path into the empty cutting path to obtain an optimal cutting path; and allowing a laser cutting module to emit laser rays for cutting in the physical cutting path and not to emit laser rays in the empty cutting path;

in the step (E), the boundary information is compared with the physical cutting path through steps of:

obtaining a vertex coordinate of each of the parts to be cut on the layout diagram; obtaining a vertex coordinate of the raw material sheet by machine vision; determining whether a part to be cut has a vertex on the boundary of the raw material sheet: if yes, calculating a slope of an edge of the part to be cut connected to the vertex; if the slope is the same as that of the boundary of the raw material sheet, indicating that the edge of the part to be cut is on the boundary of the raw material sheet; and judging edges of the parts to be cut one by one according to a cutting order selected by a selection method of the optimized cutting path.

In a second aspect, this application further provides a laser cutting system for irregular parts based on machine vision, including a layout module, a pattern recognition and arrangement module, a point set operation module, a cutting path planning module, a laser cutting module, and a vision inspection module;

wherein the layout module is configured to obtain a layout diagram according to parts to be cut;

the pattern recognition and arrangement module is configured to obtain and number vertices of each of the parts to be cut on the layout diagram, plan vertex numbers of each of the parts to be cut into a part vertex set, and randomly extract an element from the part vertex set to combine with a cutting starting point to form an empty cutting path vertex set;

the point set operation module is configured to take the empty cutting path vertex set as a travelling salesman problem (TSP), find a shortest path passing through all vertices in the empty cutting path vertex set, solve an empty cutting path of the empty cutting path vertex set by using a CPLEX algorithm, and compare empty cutting paths of empty cutting path vertex sets to obtain a shortest empty cutting path and an empty cutting path vertex set with the shortest empty cutting path;

the cutting path planning module is configured to cut the parts to be cut one by one according to an order obtained by the CPLEX algorithm; wherein when a part is cut, a vertex corresponding to a first element in an empty cutting path vertex set corresponding to the part and a vertex corresponding to a second element in the empty cutting path vertex set are respectively selected as a starting point and an ending point to generate a cycle for cutting to obtain a physical cutting path; an empty cutting path from the starting point to a selected vertex in each part to be cut is obtained; and an optimized cutting path is obtained by integrating the physical cutting path with the empty cutting path;

the laser cutting module is configured to perform laser cutting according to the physical cutting path and the empty cutting path planned by the cutting path planning module;

the point set operation module is provided with a mathematical model configured to compare the empty cutting paths of the empty cutting path vertex sets to obtain the shortest empty cutting path and the empty cutting path vertex set with the shortest empty cutting path, and the mathematical model is expressed as:

$$\min \Sigma_{e \in A} C_e x_e \quad (1)$$

s. t.

$$\Sigma_{e \in \Delta(i)} x_e = 2w_i, \forall i \in V, \quad (2)$$

$$\Sigma_{e \in \Delta(p)} x_e = 2, \forall p \in P, \quad (3)$$

$$\Sigma_{e \in \Delta(S)} x_e \leq |S|-1, \forall S \subset P, 2 \leq |S| \leq n-1 \quad (4)$$

$$x_e \in \{0,1\}, \forall e \in A, \quad (5)$$

$$w_i \in \{0,1\}, \forall i \in V_i; \quad (6)$$

wherein A is a set of edges; V is a set of all vertices; p is a part vertex set; P is a set of parts corresponding to all part vertex sets; Ce represents a length of edge e; Xe is a basic variable; $W_i$ is an auxiliary variable; Δ(i) indicates a set of edges connected to point i; Δ(p) indicates a set of edges connected to points in the part vertex set p; and S represents a subset of the set P;

the visual inspection module is configured to obtain boundary information of a raw material sheet, and compare the boundary information with the physical cutting path to judge whether the boundary information coincides with the physical cutting path;

wherein the boundary information is compared with the physical cutting path through the following steps:

obtaining a vertex coordinate of each of the parts to be cut on the layout diagram; obtaining a vertex coordinate of the raw material sheet by machine vision; determining whether a part to be cut has a vertex on the boundary of the raw material sheet; if yes, calculating a slope of an edge of the part to be cut connected to the vertex; if the slope is the same as that of the boundary of the raw material sheet, indicating that the edge of the part to be cut is on the boundary of the raw material sheet; and judging edges of the parts to be cut one by one, according to a cutting order selected by a selection method of the optimized cutting path.

Compared to the prior art, this application has the following beneficial effects.

The laser cutting method can program the shortest empty cutting path between the graph of each of the parts to be cut and the cutting starting point according to the graph dispersion of each of parts to be cut in the layout diagram, and program the physical cutting path for cutting each of the parts to be cut on the graph with own edge as the path, and finally integrate the empty cutting path and the physical cutting path into the shortest cutting path in a specific order. On one hand, the laser cutting method can automatically program a shorter cutting path on the layout diagram, and quickly find out the shortest empty path of each of the parts, improving the cutting efficiency. On the other hand, the laser cutting method can distinguish the moving path that does not need to be cut and the moving path that needs to be cut. Thus, the laser cutting module can accurately carry out laser cutting operations according to actual cutting needs, reduce the operation market of the cutting device, reduce mechanical wear, and completely avoid repeated cutting operations, ensuring cutting accuracy.

DETAILED DESCRIPTION OF EMBODIMENTS

The disclosure will be described in detail below with reference to the embodiments and accompanying drawings to further illustrate the technical solutions of the disclosure.

As shown in FIGS. 1 to 4, a laser cutting method for irregular parts based on machine vision includes the following steps (A) to (D).

Figure 1:
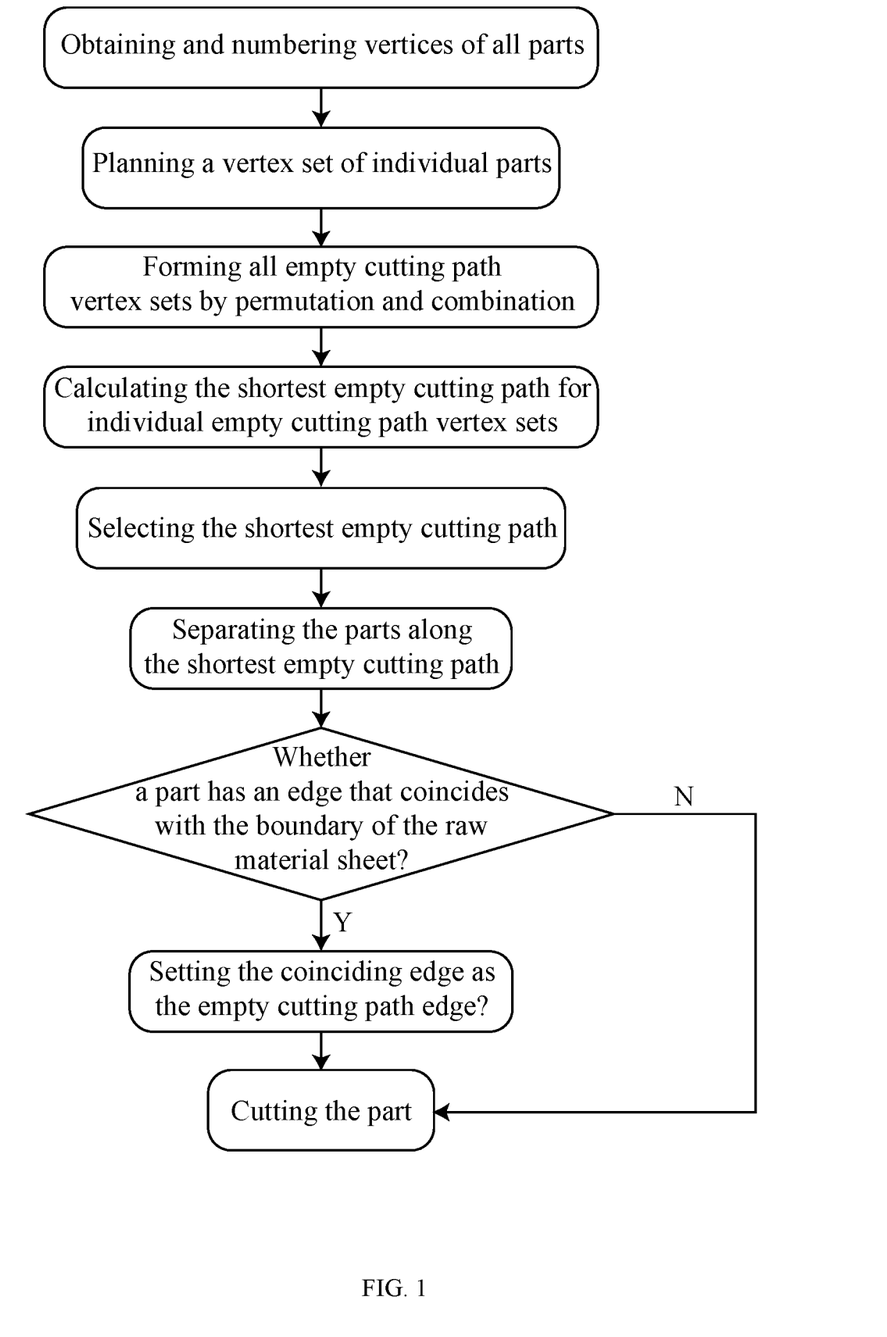
FIG. 1 is a flow chart of a laser cutting method according to one embodiment of the present disclosure.

(A) A layout diagram is obtained according to patterns of parts to be cut, and vertices of each of the parts to be cut on the layout diagram are obtained and numbered.

(B) Vertex numbers of each of the parts to be cut are planned into a part vertex set, and an element is randomly extracted from the part vertex set followed by combining with a cutting starting point to form an empty cutting path vertex set.

(C) The empty cutting path vertex set is taken as a travelling salesman problem (TSP). The shortest path passing through all vertices in the empty cutting path vertex set is found. An empty cutting path of the empty cutting path vertex set is solved by using a CPLEX algorithm. By comparing empty cutting paths of empty cutting path vertex sets, a shortest empty cutting path and an empty cutting path vertex set with the shortest empty cutting path are obtained.

(D) The parts are cut one by one according to an order obtained by the CPLEX algorithm. When cutting a part, a physical cutting path is obtained by selecting a vertex corresponding to a first element in an empty cutting path vertex set corresponding to the part as a starting point and selecting a vertex corresponding to a second element in the empty cutting path vertex set as an ending point to generate a cycle for cutting. An empty cutting path is obtained from the starting point to a selected vertex in each part to be cut. An optimized cutting path is obtained by integrating the physical cutting path with the empty cutting path.

TSP (Traveling Salesman Problem), also called the travelling salesperson problem, has attracted considerable attention in the mathematical field. Given a set of n cities, the problem is to find the shortest possible path that visits each city exactly once and returns to the starting city.

CPLEX is a mathematical optimization technique which is mainly used to improve efficiency, quickly implement strategies, and increase profitability. Mathematical optimization technique of WebSphere ILOG CPLEX can help to make better decisions about the efficient use of resources. CPLEX can make the complex business problems represent as Mathematic Programming models. Advanced optimization algorithms can help to find solutions for these models quickly.

Figure 2:
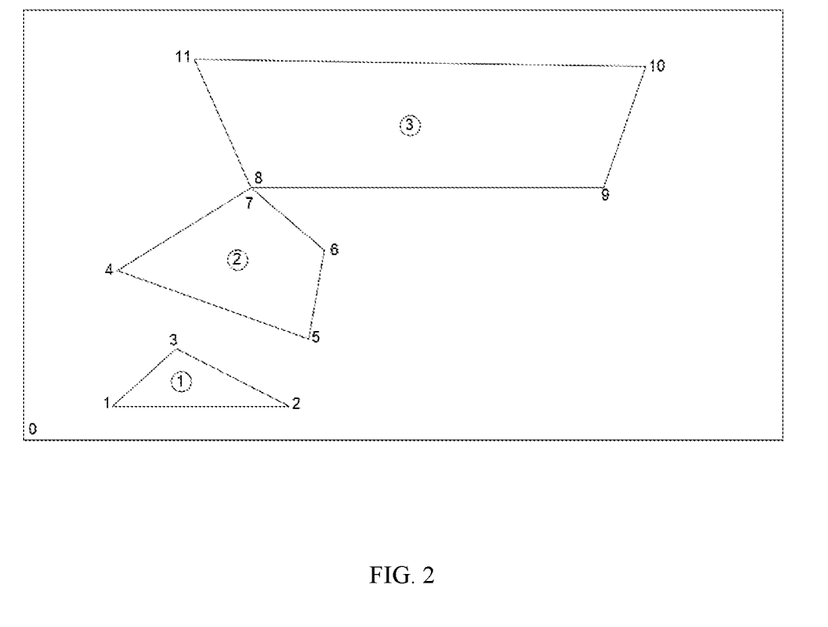
FIG. 2 schematically shows an empty cutting path in an initial state according to one embodiment of the present disclosure.
Figure 3:
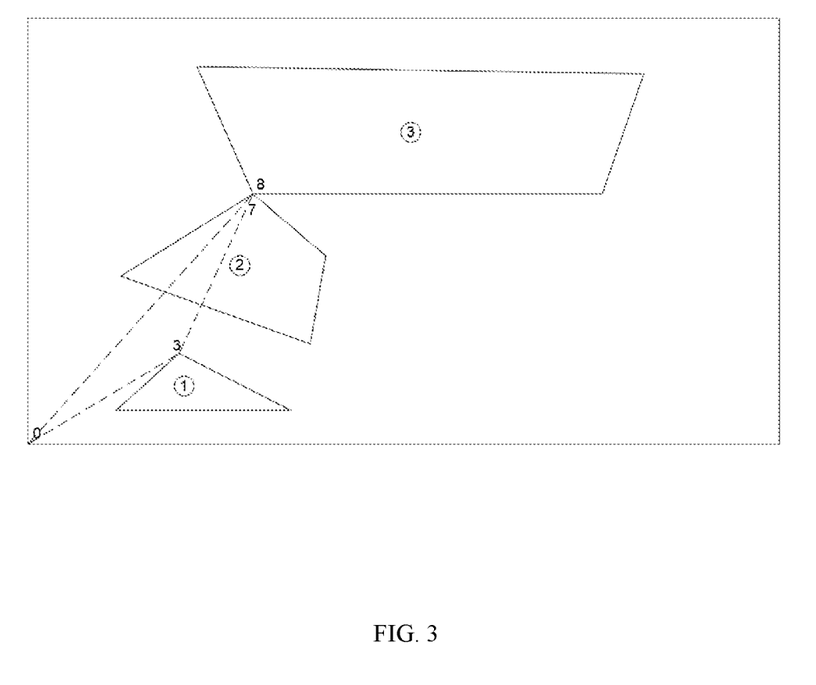
FIG. 3 schematically shows the empty cutting path in a final state according to the embodiment in FIG. 2.
Figure 4:
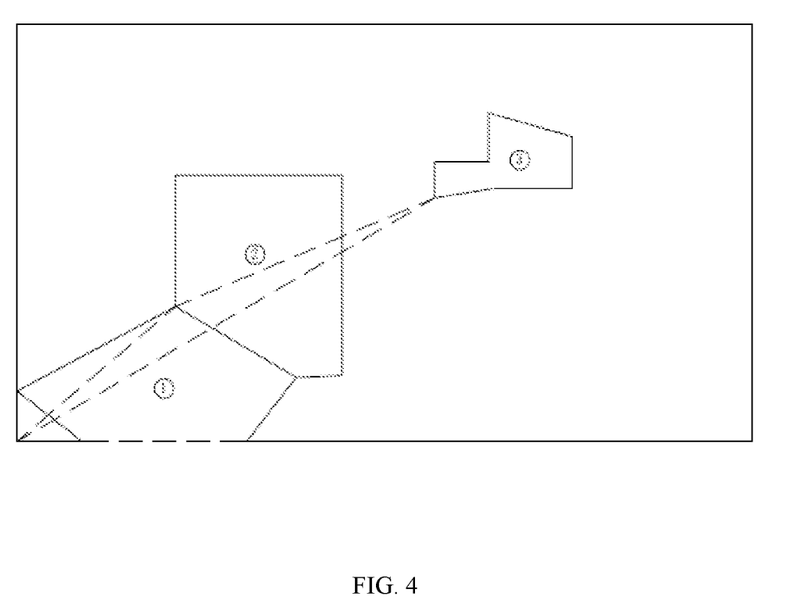
FIG. 4 schematically shows an initial state in which a physical cutting path coincident with boundaries is integrated into an empty cutting path according to one embodiment of the present disclosure.

The planning of the empty cutting path is shown in FIGS. 3 and 4. To make total path that a laser cutting module starts from the cutting starting point, cuts and separates all parts one by one, and returns to the cutting starting point shortest, in fact, that is to find the shortest total empty cutting path before the part to the part. First, all the vertices in the layout diagram are numbered, and each part vertex set is divided according to the part. As shown in FIG. 2, there are vertex sets of three parts, the part vertex set of part (1) is [1, 2, 3], the part vertex set of part (2) is [4, 5, 6, 7], and the part vertex set of part (3) is [8, 9, 10, 11]. Only one element is select from each part vertex set to add to a new empty cutting path vertex set, and then the starting point 0 is add to the new empty cutting path vertex set. After continuous combination, all empty cutting path vertex sets of [0, 1, 4, 8], [0, 2, 4, 8] . . . are obtained. It is a TSP problem to find the shortest length of each empty cutting path vertex set to form a Hamilton cycle, and then the optimal solution corresponding to each empty cutting path vertex set is solved by calling the CPLEX algorithm, and the shortest path in these optimal solutions is selected as the empty cutting path of the final cutting scheme.

FIG. 3 is the cutting scheme result diagram obtained after selecting the shortest empty cutting path in the layout diagram in FIG. 2. The laser cutting device can cut and separate the parts according to the set of vertices of the shortest empty cutting path vertex set [0, 3, 7, 8] and then return to the starting point. The line path shown in FIG. 3 is the optimized cutting path.

The empty cutting travel is a moving path that does not need to cut the parts to be cut, and the corresponding planned moving path is the empty cutting path. The physical cutting travel is the moving path that needs to cut according to the cutting needs, and the corresponding planned moving path is the physical cutting path.

The laser cutting method can program the shortest empty cutting path between the graph of each of the parts to be cut and the cutting starting point according to the graph dispersion of each of parts to be cut in the layout diagram, and program the physical cutting path for cutting each of the parts to be cut on the graph with own edge as the path, and finally integrate the empty cutting path and the physical cutting path into the shortest cutting path in a specific order. On one hand, the laser cutting method can automatically program a shorter cutting path on the layout diagram, and quickly find out the shortest empty path of each of the parts, improving the cutting efficiency. On the other hand, the laser cutting method can distinguish the moving path that does not need to be cut and the moving path that needs to be cut. Thus, the laser cutting module can accurately carry out laser cutting operations according to actual cutting needs, reduce the operation market of the cutting device, reduce mechanical wear, and completely avoid repeated cutting operations, ensuring cutting accuracy.

In the step (C), a mathematical model for comparing the empty cutting paths of the empty cutting path vertex sets to obtain the shortest empty cutting path and the empty cutting path vertex set with the shortest empty cutting path is expressed as follows:

$$\min \Sigma_{e \in A} C_e x_e \quad (1)$$

s. t.

$$\Sigma_{e \in \Delta(i)} x_e = 2w_i, \forall i \in V, \quad (2)$$

$$\Sigma_{e \in \Delta(p)} x_e = 2, \forall p \in P, \quad (3)$$

$$\Sigma_{e \in \Delta(S)} x_e \leq |S|-1, \forall S \subset P, 2 \leq |S| \leq n-1 \quad (4)$$

$$x_e \in \{0,1\}, \forall e \in A, \quad (5)$$

$$w_i \in \{0,1\}, \forall i \in V_i; \quad (6)$$

where A is a set of edges; V is a set of all vertices; p is a part vertex set; P is a set of parts corresponding to all part vertex sets; Ce represents a length of edge e; Xe is a basic variable; $W_i$ is an auxiliary variable; Δ(i) indicates a set of edges connected to point i; Δ(p) indicates a set of edges connected to points in the part vertex set p; and S represents a subset of the set P.

Objective function (1) is used to find the set of edges with the smallest connection length.

Constraint (2): ensuring that the out-degree and in-degree of each vertex are 0 or 2.

Constraint (3): ensuring that the access degree of each part is 2.

Constraint (4): avoiding forming sub-cycles.

Constraints (5) and (6): the values of the two variables are 0-1.

The objective function (1) is to find the shortest empty cutting path. Constraint (2) ensures that the line of each vertex in the layout diagram is 0 or 2. Constraint (3) ensures that each part is connected to two empty travel edges. Constraint (4) ensures that there is not unreasonable sub-cycle travel to obtain a complete cycle. Constraints (5) and (6) define values of the variables from 0 to 1.

Thus, through calculation, the shortest empty cutting path can shorten the cutting length and cutting time and improve the cutting efficiency.

The laser cutting method further includes the following step (E). When cutting each part one by one, the visual inspection module obtains the boundary information of a raw material sheet and compares the boundary information with the physical cutting path. When the physical cutting path coincides with a boundary of the raw material sheet, the physical cutting path is integrated into the empty cutting path to obtain an optimal cutting path. The laser cutting module can emit laser rays for cutting in the physical cutting path and not emit laser rays in the empty cutting path.

After the step (E) is set, the empty travel that does not need to be cut by the laser can be further identified during the optimization of the cutting path. Thus, when the parts to be cut and the boundary of the raw material sheet coincides or there is the overlapping edge between the cutting parts to be cut, the overlapping edge or boundary can be directly skipped without laser cutting operation, which can avoid repeated cutting of the same edge of the part to be cut, further improving the cutting efficiency and accuracy of each part to be cut.

In the step (E), the boundary information is compared with the physical cutting path. Specifically, a vertex coordinate of each of the parts to be cut on the layout diagram is obtained, and a vertex coordinate of the raw material sheet is obtained by machine vision. It is determined whether a part to be cut has a vertex on the boundary of the raw material sheet: if yes, calculate a slope of an edge of the part to be cut connected to the vertex. If the slope is the same as that of the boundary of the raw material sheet, indicate that the edge of the part to be cut is on the boundary of the raw material sheet. According to a cutting order selected by a selection method of the optimized cutting path, it is judged edges of the parts to be cut one by one. Thus, before cutting each part to be cut, the edge of the part to be cut and the boundary between the raw material sheet can be updated and identified, and the overlapping position can be programed as an empty travel, thereby making the cutting operation of each part to be cut more efficient and accurate.

Figure 5:
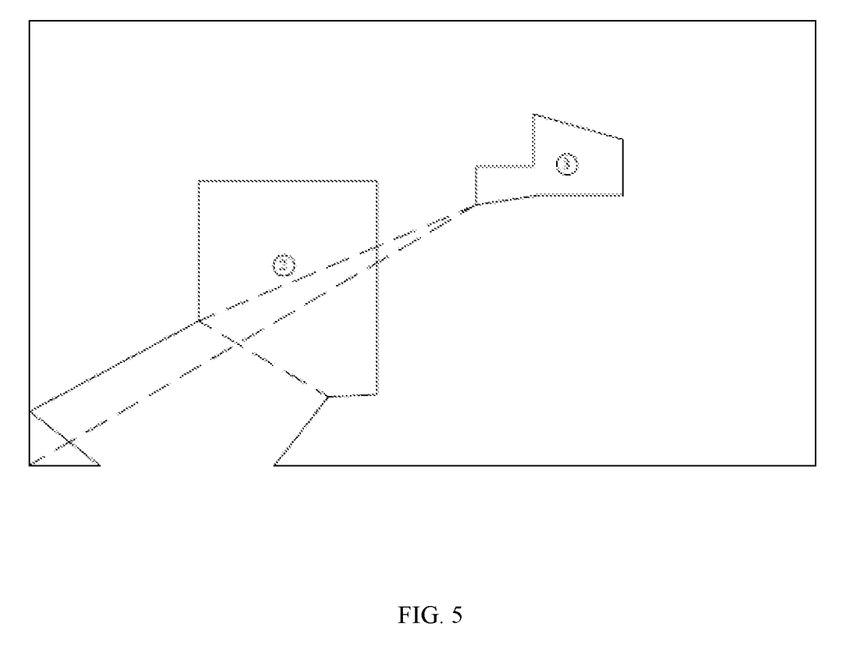
FIG. 5 schematically shows a final state in which the physical cutting path coincident with boundaries is integrated into the empty cutting path according to one embodiment of the present disclosure.

As shown in FIG. 4, the parts to be cut in the layout diagram may be exactly arranged on the boundary of the raw material sheet. At this case, it is necessary to use the visual inspection module to assist cutting. The position where the part to be cut and the boundary of the raw material sheet coincide is counted as the empty cutting path to reduce loss and saving costs. When one part is cut, if the next part to be cut is exactly the boundary of the raw material sheet, it also needs to be planned as the empty cutting path in accordance with the above embodiment. After separating this part, the visual inspection module is used to re-identify the vertex coordinates of the raw material sheet at this time, and the edge of the empty cutting path is divided through judgment. FIG. 4 shows the edge of the empty cutting path of the first part to be cut, and FIG. 5 shows the edge of the empty cutting path of the next part to be cut after separating the previous part based on FIG. 4.

Provided herein a laser cutting system, which includes a layout module, a pattern recognition and arrangement module, a point set operation module, a cutting path planning module, a laser cutting module, and a vision inspection module.

The layout module is configured to obtain the layout diagram according to parts to be cut.

The pattern recognition and arrangement module is configured to obtain and number vertices of each of the parts to be cut on the layout diagram, plan vertex numbers of each of the parts to be cut into a part vertex set, and randomly extract an element from the part vertex set to combine with a cutting starting point to form an empty cutting path vertex set.

The point set operation module is configured to take the empty cutting path vertex set as a travelling salesman problem (TSP), find a shortest path passing through all vertices in the empty cutting path vertex set, solve an empty cutting path of the empty cutting path vertex set by using a CPLEX algorithm, and compare empty cutting paths of empty cutting path vertex sets to obtain a shortest empty cutting path and an empty cutting path vertex set with the shortest empty cutting path.

The cutting path planning module is configured to cut the parts to be cut one by one according to an order obtained by the CPLEX algorithm. When a part is cut, a vertex corresponding to a first element in an empty cutting path vertex set corresponding to the part and a vertex corresponding to a second element in the empty cutting path vertex set are respectively selected as a starting point and an ending point to generate a cycle for cutting to obtain a physical cutting path. An empty cutting path from the starting point to a selected vertex in each part to be cut is obtained. An optimized cutting path is obtained by integrating the physical cutting path with the empty cutting path.

The laser cutting module is configured to perform laser cutting according to the physical cutting path and the empty cutting path planned by the cutting path planning module.

The point set operation module is provided with a mathematical model configured to compare the empty cutting paths of the empty cutting path vertex sets to obtain the shortest empty cutting path and the empty cutting path vertex set with the shortest empty cutting path. The mathematical model is expressed as:

$$\min \Sigma_{e \in A} C_e x_e \qquad (1)$$

s. t.

$$\Sigma_{e \in \Delta(i)} x_e = 2w_i, \forall i \in V, \qquad (2)$$

$$\Sigma_{e \in \Delta(p)} x_e = 2, \forall p \in P, \qquad (3)$$

$$\Sigma_{e \in \Delta(S)} x_e \leq |S| - 1, \forall S \subset P, 2 \leq |S| \leq n-1 \qquad (4)$$

$$x_e \in \{0,1\}, \forall e \in A, \qquad (5)$$

$$w_i \in \{0,1\}, \forall i \in V_i; \qquad (6)$$

where A is a set of edges; V is a set of all vertices; p is a part vertex set; P is a set of parts corresponding to all part vertex sets; Ce represents a length of edge e; Xe is a basic variable; $W_i$ is an auxiliary variable; $\Delta(i)$ indicates a set of edges connected to point i; Δ(p) indicates a set of edges connected to points in the part vertex set p; and S represents a subset of the set P.

Objective function (1) is used to find the set of edges with the smallest connection length.

Constraint (2): ensuring that the access degree of each vertex is 0 or 2.

Constraint (3): ensuring that the access degree of each part is 2.

Constraint (4): avoiding forming sub-cycles.

Constraints (5) and (6): the values of the two variables lie in 0-1.

The visual inspection module is configured to obtain boundary information of a raw material sheet and compare the boundary information with the physical cutting path to judge whether the boundary information coincides with the physical cutting path.

The visual inspection module compares the boundary information with the physical cutting path to judge whether the boundary information coincides with the physical cutting path. Specifically, a vertex coordinate of each of the parts to be cut on the layout diagram is obtained, and a vertex coordinate of the raw material sheet is obtained by machine vision. It is determined whether the part to be cut has a vertex on the boundary of the raw material sheet. If yes, calculate a slope of an edge of the part to be cut connected to the vertex. If the slope is the same as that of the boundary of the raw material sheet, the edge of the part to be cut is on the boundary of the raw material sheet. According to the cutting order selected by a selection method of the optimized cutting path, edges of the parts to be cut are judged one by one.

Thus, the laser cutting system can quickly find the shortest empty cutting path connecting the starting point to each part to be cut, remove the path that coincides with the boundary of the raw material sheet and plan the coinciding path into the empty cutting path, and plan the shortest cutting path including the empty cutting path and the physical cutting path. The laser cutting module can selectively carry out empty movement or laser cutting operation according to planning requirements. The laser cutting system can reduce the operating time of the cutting device, reduce mechanical wear, speed up the cutting speed, improve the automation level of the production line, improve the efficiency of laser cutting, and shorten the production cycle.

As used herein, terms are only used for describing embodiments of the disclosure and not intended to limit the disclosure. As used herein, unless otherwise expressly specified and defined, the singular form also includes a plural meaning. Furthermore, the terms, for example, "including" and/or "comprising", indicate features, steps, operations, devices, components, and/or combinations thereof.

Unless otherwise specified, the relative arrangement of the components and steps, numerical expressions, and numerical values described in the embodiments are not intended to limit the disclosure. In addition, for the convenience of presentation, various parts shown in the drawings are not presented according to the actual scale. The techniques, methods and equipment known to those skilled in the art may not be discussed in detail herein, but the techniques, methods and equipment should be considered as part of the disclosure where appropriate. Any specific values shown and discussed in the embodiments should be interpreted as merely illustrative, and not as limitations to the disclosure. Thus, different values can be set in other embodiments. It should be noted that similar reference signs and letters in the drawings indicate similar terms. Therefore, once an item is defined in one drawing, it is not needed to be further discussed in subsequent drawings.

As used herein, it should be understood that the orientation or positional relationship indicated by the terms "front", "rear", "upper", "lower", "left", "right", "horizontal", "vertical", "top", and "bottom" etc. is based on the orientation or positional relationship shown in the accompanying drawings, which is only for the convenience of describing the technical solutions and simplifying the description, rather than indicating or implying that the indicated device or element must have a specific orientation, be constructed or operated in a specific orientation. The orientation terms "inside" and "outside" refer to the inside and outside relative to the contour of each part.

For ease of description, spatially relative terms, such as "above", "on", "on the surface of", and "upper", are used to describe the spatial position relationship of the referred device or feature relative to other devices or features in the drawings. It should be understood that the spatially relative terms are also intended to include other orientations in use or operation in addition to those described in the drawings. For example, after inverted, the device described as "above" or "on" other members or devices will be as accordingly adjusted to "below" or "under" other members or devices. Thus, the exemplary term "above" may include "above" and "below" meanings. The referred device can also be positioned in other different ways (rotated by 90 degrees or in other orientations) and interpreted accordingly for the spatial relative description used herein.

The technical principles of the disclosure have been described in detail above in conjunction with embodiments. These embodiments are only illustrative of the present disclosure, and not intended to limit the present disclosure. It should be understood that other embodiments made by those skilled in the art based on the content disclosed herein without paying creative effort should fall within the scope of the disclosure defined by the appended claims.

What is claimed is:

1. A laser cutting method for irregular parts based on machine vision, comprising:
   (A) obtaining a layout diagram according to patterns of parts to be cut; and obtaining and numbering vertices of each of the parts to be cut on the layout diagram;
   (B) planning vertex numbers of each of the parts to be cut into a part vertex set; and randomly extracting an element from the part vertex set followed by combining with a cutting starting point to form an empty cutting path vertex set;
   (C) taking the empty cutting path vertex set as a travelling salesman problem (TSP); finding a shortest path passing through all vertices in the empty cutting path vertex set; solving an empty cutting path of the empty cutting path vertex set by using a CPLEX algorithm; and comparing empty cutting paths of empty cutting path vertex sets to obtain a shortest empty cutting path and an empty cutting path vertex set with the shortest empty cutting path;
   (D) cutting the parts to be cut one by one according to an order obtained by the CPLEX algorithm; when cutting a part, selecting a vertex corresponding to a first element in an empty cutting path vertex set corresponding to the part as a starting point and selecting a vertex corresponding to a second element in the empty cutting path vertex set as an ending point to generate a cycle for cutting to obtain a physical cutting path; obtaining an empty cutting path from the starting point to a selected vertex in each part to be cut; and integrating the physical cutting path with the empty cutting path to obtain an optimized cutting path; and (E) when cutting the parts to be cut one by one, obtaining boundary information of a raw material sheet, and comparing the boundary information with the physical cutting path; when the physical cutting path coincides with a boundary of the raw material sheet, integrating the physical cutting path into the empty cutting path to obtain an optimal cutting path; and emitting laser rays for cutting in the physical cutting path;

in the step (C), a mathematical model for comparing the empty cutting paths of the empty cutting path vertex sets to obtain the shortest empty cutting path and the empty cutting path vertex set with the shortest empty cutting path is expressed as follows:

$$\min \Sigma_{e \in A} C_e x_e \qquad (1)$$

s. t.

$$\Sigma_{e \in \Delta(i)} x_e = 2w_i, \forall i \in V, \qquad (2)$$

$$\Sigma_{e \in \Delta(p)} x_e = 2, \forall p \in P, \qquad (3)$$

$$\Sigma_{e \in \Delta(S)} x_e \leq |S|-1, \forall SCP, 2 \leq |S| \leq n-1 \qquad (4)$$

$$x_e \in \{0,1\}, \forall e \in A, \qquad (5)$$

$$w_i \in \{0,1\}, \forall i \in V,; \qquad (6)$$

wherein A is a set of edges; V is a set of all vertices; p is a part vertex set; P is a set of parts corresponding to all part vertex sets; Ce represents a length of edge e; Xe is a basic variable; $W_i$ is an auxiliary variable; $\Delta(i)$ indicates a set of edges connected to point i; $\Delta(p)$ indicates a set of edges connected to points in the part vertex set p; and S represents a subset of the set P; and in the step (E), the boundary information is compared with the physical cutting path through steps of:

obtaining a vertex coordinate of each of the parts to be cut on the layout diagram; obtaining a vertex coordinate of the raw material sheet by machine vision; determining whether a part to be cut has a vertex on the boundary of the raw material sheet: if yes, calculating a slope of an edge of the part to be cut connected to the vertex; if the slope is the same as that of the boundary of the raw material sheet, indicating that the edge of the part to be cut is on the boundary of the raw material sheet; and judging edges of the parts to be cut one by one according to a cutting order selected by a selection method of the optimized cutting path.

2. A laser cutting system for irregular parts based on machine vision, comprising:

a memory with one or more programs stored thereon; and one or more processors;

wherein the one or more programs are configured to be executed by the one or more processors to perform:

obtaining a layout diagram according to patterns of parts to be cut;

obtaining and numbering vertices of each of the parts to be cut on the layout diagram, planning vertex numbers of each of the parts to be cut into a part vertex set, and randomly extracting an element from the part vertex set to combine with a cutting starting point to form an empty cutting path vertex set;

taking the empty cutting path vertex set as a travelling salesman problem (TSP), finding a shortest path passing through all vertices in the empty cutting path vertex set, solving an empty cutting path of the empty cutting path vertex set by using a CPLEX algorithm, and comparing empty cutting paths of empty cutting path vertex sets to obtain a shortest empty cutting path and an empty cutting path vertex set with the shortest empty cutting path;

cutting the parts to be cut one by one according to an order obtained by the CPLEX algorithm; when cutting a part, selecting a vertex corresponding to a first element in an empty cutting path vertex set corresponding to the part as a starting point and selecting a vertex corresponding to a second element in the empty cutting path vertex set as an ending point to generate a cycle for cutting to obtain a physical cutting path; obtaining an empty cutting path from the starting point to a selected vertex in each part to be cut; and obtaining an optimized cutting path by integrating the physical cutting path with the empty cutting path;

comparing the empty cutting paths of the empty cutting path vertex sets to obtain the shortest empty cutting path and the empty cutting path vertex set with the shortest empty cutting path by using a mathematical model that is expressed as:

$$\min \Sigma_{e \in A} C_e x_e \qquad (1)$$

s. t.

$$\Sigma_{e \in \Delta(i)} x_e = 2w_i, \forall i \in V, \qquad (2)$$

$$\Sigma_{e \in \Delta(p)} x_e = 2, \forall p \in P, \qquad (3)$$

$$\Sigma_{e \in \Delta(S)} x_e \leq |S|-1, \forall SCP, 2 \leq |S| \leq n-1 \qquad (4)$$

$$x_e \in \{0,1\}, \forall e \in A, \qquad (5)$$

$$w_i \in \{0,1\}, \forall i \in V,; \qquad (6)$$

wherein A is a set of edges; V is a set of all vertices; p is a part vertex set; P is a set of parts corresponding to all part vertex sets; Ce represents a length of edge e; Xe is a basic variable; $W_i$ is an auxiliary variable; $\Delta(i)$ indicates a set of edges connected to point i; $\Delta(p)$ indicates a set of edges connected to points in the part vertex set p; and S represents a subset of the set P;

obtaining boundary information of a raw material sheet, and comparing the boundary information with the physical cutting path to judge whether the boundary information coincides with the physical cutting path; when the physical cutting path coincides with a boundary of the raw material sheet, integrating the physical cutting path into the empty cutting path to obtain an optimal cutting path; and emitting laser rays for cutting in the physical cutting path;

wherein the boundary information is compared with the physical cutting path through the following steps:

obtaining a vertex coordinate of each of the parts to be cut on the layout diagram; obtaining a vertex coordinate of the raw material sheet by machine vision; determining whether a part to be cut has a vertex on the boundary of the raw material sheet; if yes, calculating a slope of an edge of the part to be cut connected to the vertex; if the slope is the same as that of the boundary of the raw material sheet, indicating that the edge of the part to be cut is on the boundary of the raw material sheet; and judging edges of the parts to be cut one by one, according to a cutting order selected by a selection method of the optimized cutting path.

* * * * *